US006874539B2

(12) United States Patent
Weber

(10) Patent No.: US 6,874,539 B2
(45) Date of Patent: Apr. 5, 2005

(54) HYDRAULIC ACCUMULATOR, ESPECIALLY BLADDER ACCUMULATOR

(75) Inventor: Norbert Weber, Sulzbach (DE)

(73) Assignee: HYDAC Technology GmbH, Sulzbach/Saar (DE)

( * ) Notice: Subject to any disclaimer, the term of this patent is extended or adjusted under 35 U.S.C. 154(b) by 0 days.

(21) Appl. No.: 10/466,424

(22) PCT Filed: Jan. 4, 2002

(86) PCT No.: PCT/EP02/00024

§ 371 (c)(1),
(2), (4) Date: Jul. 16, 2003

(87) PCT Pub. No.: WO02/059486

PCT Pub. Date: Aug. 1, 2002

(65) Prior Publication Data

US 2004/0050439 A1 Mar. 18, 2004

(30) Foreign Application Priority Data

Jan. 25, 2001 (DE) ........................................ 101 03 172

(51) Int. Cl.[7] ................................................ F16L 55/04
(52) U.S. Cl. ........................................... 138/30; 138/26
(58) Field of Search ..................................... 138/26, 30

(56) References Cited

U.S. PATENT DOCUMENTS 2,385,016 A * 9/1945 Mercier ....................... 138/30
2,880,758 A * 4/1959 Mercier ....................... 138/30
4,080,996 A * 3/1978 Zahid .......................... 138/30
4,112,978 A * 9/1978 Olbrich et al. ................ 138/30
4,335,751 A 6/1982 Sugimura et al.
4,338,968 A * 7/1982 Mercier ....................... 138/30
4,526,205 A * 7/1985 Sugimura et al. ............. 138/30
4,671,325 A * 6/1987 Otter ........................... 138/30
5,097,862 A * 3/1992 Schneider ................... 137/207
5,261,471 A * 11/1993 Freigang et al. ............ 152/415

FOREIGN PATENT DOCUMENTS

FR 1154187 4/1958
GB 2104964 3/1983

* cited by examiner

*Primary Examiner*—James Hook
(74) *Attorney, Agent, or Firm*—Roylance, Abrams, Berdo & Goodman, L.L.P.

(57) ABSTRACT

A hydraulic accumulator, especially a bladder accumulator, includes an accumulator housing (10), and a separation element disposed in and separating the accumulator housing interior into a gas chamber (16) adjoining an inlet (14) on the gas side from a fluid chamber (18) adjoining an inlet (20) on the fluid side. The inlet on the fluid side has a fluid connecting neck (22) having a valve support (40) disposed in the neck. The valve support has fluid openings (42), and a disk-shaped valve body (32) that tapers towards the valve shaft (46) on its side facing the valve support (40). The valve shaft can be pretensioned via a force accumulator (62) into the open position releasing the fluid opening, can be displaced into its closed position by a displacement of the separation element (12), and projects into the fluid chamber (18) in the open position. The valve body (32) is an integral, especially one-piece, component of the valve support (40) that is guided along its outer periphery (56) within the connecting neck (22) so as to be displaceable in it, creating a hydraulic accumulator that is comparatively simple and inexpensive in production.

7 Claims, 3 Drawing Sheets

State of the Art

HYDRAULIC ACCUMULATOR, ESPECIALLY BLADDER ACCUMULATOR

FIELD OF THE INVENTION

The present invention relates to a hydraulic accumulator, especially a bladder accumulator, with an accumulator housing. A separating element is located in the housing and separates in the accumulator housing a gas chamber which borders a gas-side access from a fluid chamber which borders the fluid-side access having a fluid connecting piece. A valve support is located in the connecting piece, has fluid passages, and has a plate-like valve body tapering toward the valve shaft on its side facing the valve support. The valve body is pretensioned into its open position opening the fluid passage through an energy accumulator, can be moved into its closed position by the motion of the separating element, and projects in the open position into the fluid chamber.

BACKGROUND OF THE INVENTION

Hydraulic accumulators with biased fluid access values are commercially available. In the technical reference published by Mannesmann Rexroth GmbH "Der Hydraulic-trainer" [Hydraulic Training Manual], Volume 1 on page 165, a bladder accumulator of this type is described. In the disclosed bladder accumulator, the valve arrangement is made as a seat valve. On the end edge of the connecting piece facing the fluid chamber, the stationary valve seat is a conical surface which interacts with the corresponding conical surface on the valve plate of the movable valve body. It is made similar to the control valves which are conventional in valve-controlled internal; combustion engines, i.e., the valve plate is located on a shaft which is guided in a valve guide as the valve support for the valve lifting motion extending between the open position and closed position. The valve guide is a component of the connecting piece.

The disadvantage of the conventional valve arrangement is the resulting high production costs due to the required expenditures for producing and machining of a plurality of individual parts as a result of this valve design. To ensure proper operation of the valve arrangement, the valve guide installed in the connecting piece must be made carefully with respect to production tolerances for both alignment and fit. Moreover, the corresponding machining of the conical surfaces which form the valve seat is necessary. This machinery likewise increases production costs, due at least to the valve plate of the valve body being produced by forging.

DE-A-199 06 800 discloses a hydraulic accumulator having a housing with an interior divided by a media separating element into two chambers. The first chamber is filled with a gas. The second chamber is filled with a liquid. In the hydraulic connection, a bottom valve with a closing body can be actuated by the media separation element in the form of the actuating plate of a spring bellows. The valve enables the second chamber to be filled with liquid and prevents the second chamber from being completely evacuated.

To both prevent damage of the bottom valve and also unintentional emergence of liquid, and thus, to ensure a considerable increase of operating reliability, the closing body, in this known approach, can be moved by the media separating element into a position in which the function of a hydraulic piston is performed. The closing body, on its side facing the separating plate of the spring bellows accumulator, has a spherical actuating part. In this respect, application of force with spot force peaks takes place by the media separating element on the closing body. The known valve body is completely guided in the connecting piece and requires a rubber-elastic sealing means for its sealing relative to the connecting piece on the outer periphery side. The rubber-elastic sealing means are basically subject to wear so that they must be replaced by new ones from time to time to ensure the operating reliability of the hydraulic accumulator.

FR 1 154 187 discloses a generic hydraulic accumulator, especially a bladder accumulator, with an accumulator housing and a separating element located therein and separating the accumulator housing interior into a gas chamber which borders a gas-side access and a fluid chamber which borders the fluid-side access. The fluid-side access has a fluid connecting piece with a valve support located on the connecting piece, a fluid passage and a plate-like valve body tapering toward the valve shaft on its side facing the valve support. The valve body is pretensioned into its open position clearing the fluid passage by an energy accumulator in the form of a compression spring, and can be moved into its closed position by the motion of the separating element. Also, the valve body projects in the open position into the fluid chamber. The valve body is an integral, especially a one-piece component, of the valve support guided to be able to move lengthwise along its outside periphery within the connecting piece. To limit the path of travel, the valve support is movably guided against a stop in the connecting piece. The stop is a sealing ring. In the known approach, the valve support has only one fluid passage which is otherwise penetrated by the energy accumulator in the form of the compression spring. In this respect, the known approach has a complex structure to increase production costs and accordingly, adversely affect operating reliability.

GB 2 104 964 discloses a generic hydraulic accumulator, especially a bladder accumulator comparable to the aforementioned French citation. The energy accumulator is a compression spring located underneath the valve body and extends between the valve body and the connecting piece. This known approach abandons a sealing ring. The piston-like valve body is securely held by a stop of the connecting piece. This approach has only one fluid passage in the valve body and is likewise complex and expensive to produce.

U.S. Pat. No. 4,335,751 discloses a membrane accumulator as a hydraulic accumulator in which in the connecting piece for carrying fluid has a fluid guiding part screwed in the connecting piece. The guiding part includes several fluid passages diametrically located relative to its lengthwise axis. On its top, the fluid guiding part has a plate-like guide surface which diverts the flow of fluid from the fluid passages to the fluid side of the hydraulic accumulator. The fluid guiding surface is an immovably integral component of the fluid guiding part fixed in the connecting piece of the membrane accumulator. The outside diameter of the guide surface is selected such that, from the side of the connecting piece, a screwing-in process is possible. The guide surface cannot extend over the edge-side boundary surfaces of the connecting piece toward the interior of the accumulator in the manner of a valve or the like. With the static arrangement of the fluid guiding part, based on the geometrical dimensions of the plate-like guiding surface, a valve function cannot be perceived, as in the above described approaches, even after corresponding modification.

SUMMARY OF THE INVENTION

Objects of the present invention are to provide a hydraulic accumulator which can be produced comparatively easily and economically, and simultaneously has increased operating reliability and longer maintenance intervals.

In a hydraulic accumulator, these objects are achieved in the present invention by the several fluid passages in the valve support diametrically located relative to its lengthwise axis and to the lengthwise axis of the valve body opposite one another. The fluid passages are bordered to the inside by the valve shaft of the valve body. The energy accumulator is located underneath the piston-like valve body between it and the connecting piece.

By eliminating a separate valve structure installed in the connecting piece, the cost for production, machining and assembly is greatly reduced. With the approach of the present invention, the valve body can be made as a component of the valve support in the manner of an insertion module. The insertion module can be quickly and easily inserted into the fluid connecting piece and can be retained to be able to move lengthwise therein. With respect to the modular structure, in the manner of a module, adaptations to altered size rations, especially with respect to the connecting piece, for the hydraulic accumulator can be quickly and easily done. Furthermore, the required number of fluid passages in the valve support can be structurally provided easily and economically.

The arrangement of the energy accumulator also supports the modular structure of the approach. The energy accumulator can be easily and economically inserted into the connecting piece.

Since the valve support is guided on its outer periphery side along the inside circumference of the connecting piece, the guide surface can be enlarged such that secure, fitted guidance can be achieved. This arrangement increases the operating reliability of the present invention. Furthermore, the sealing system which is subject to wear can be completely abandoned.

Based on the plate-like configuration of the valve body, flat contact of the separating element takes place so that flat actuation takes place carefully. This actuation likewise helps to reduce wear, and consequently, benefits the operating reliability of the hydraulic accumulator of the present invention.

Preferably, in the maximum possible open position of the valve body, the valve support strikes a stop in the connecting piece. In the completely closed position of the valve body, its plate edge is preferably in contact with the connecting piece.

In one preferred embodiment of the hydraulic accumulator of the present invention, the stop is formed by a sealing ring which fits into a recess on the inside periphery of the connecting piece. The sealing ring can then be reliably inserted by a mounting groove on the outside periphery of the valve support into the recess on the connecting piece. With a simple catch process against the action of the compression spring, in only one process the insertion module can be completely installed. The path between the stop and the end-sided outlet of the mounting groove is made especially larger than the free path of travel of the valve body from the maximum possible open position to its completely closed position in order to later achieve unhindered operation of the valve body with the valve support and to enable installation.

Preferably, the valve body with the valve support is designed to be machined as a turned part. The valve means of the present invention then can be implemented from a rod-shaped base material by conventional automatic lathes in in especially economical manner. The forging processes ordinarily used to date entails a distinct cost increase for the valve plate. Preferably, the fluid passages are economically implemented in a valve support in the form of individual holes.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
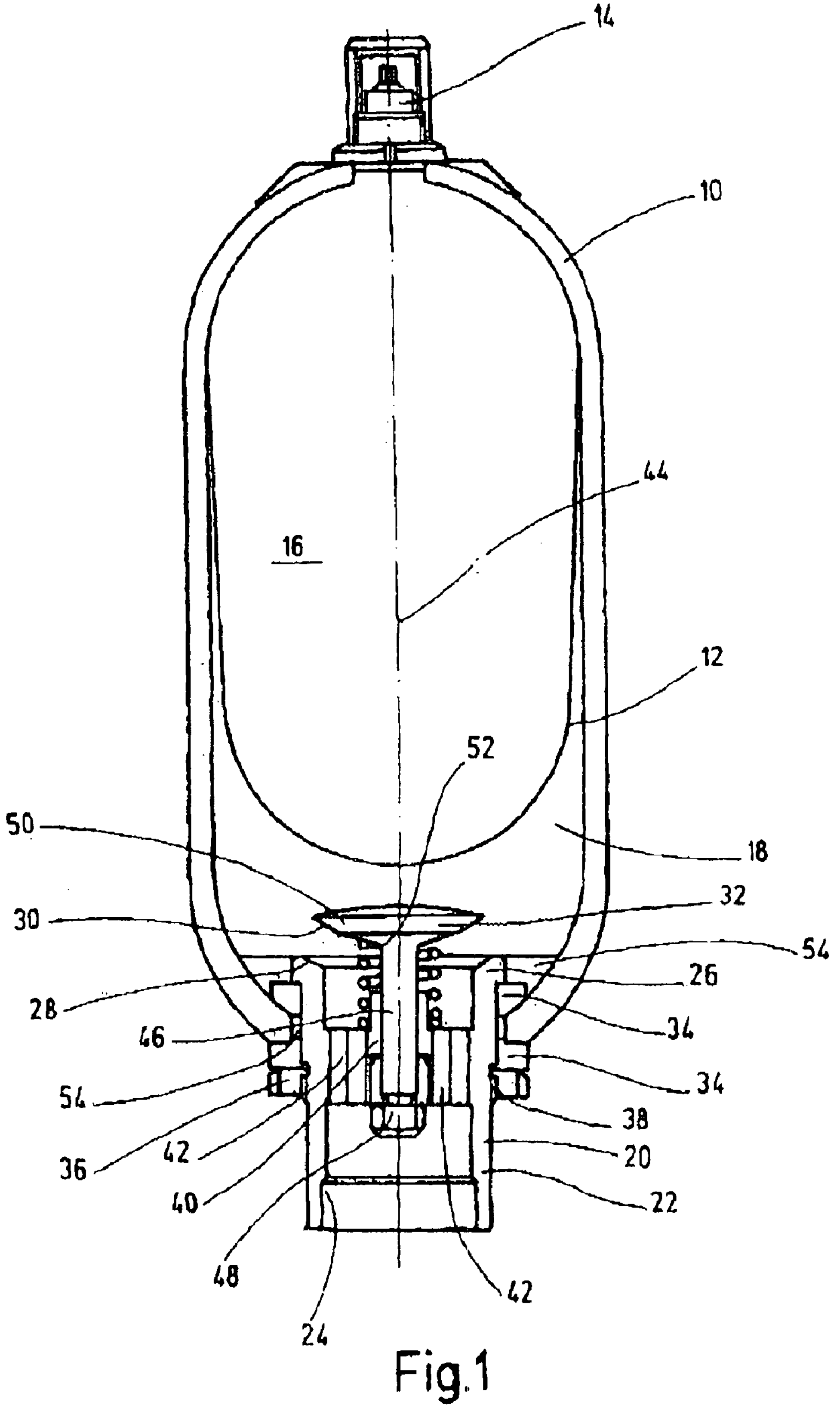
FIG. 1 is a side elevational view, partially in a section, of known hydraulic accumulator in the form of a bladder accumulator.

FIG. 1 shows a conventional bladder accumulator with an accumulator housing 10 made as a pressurized housing. In the accumulator housing 10, an elastically flexible separating element 12 separates the gas chamber 16 which borders the gas-side access 14 from the fluid chamber 18 which borders the fluid-side access 20. The fluid-side access 20 has a fluid connecting piece 22 made in the form of a hollow cylinder. In FIG. 1, the connecting piece 22 on its lower inner side has a connecting point 24 with internal threads to which a fluid line can be connected. On its opposite end, the connecting piece 22 has a widened area 26 with an inner peripheral side provided with a contact bevel 28 for contacting the lower plate edge 30 of the valve body 32 in its closed position (not shown). To fix the fluid connecting piece 22 on the lower open end of the accumulator housing 10, fixing rings 34 are located within and outside of the accumulator housing 10. For bracing of the fixing rings 34 against one another for purposes of fixing the connecting piece 22 on the lower edge of the accumulator housing, a lock nut 36 can be screwed onto the outside thread 38 of the connecting piece 22.

In the middle of the connecting piece 22 in the area of the fluid-carrying part of the hydraulic accumulator, a valve support 40 has fluid passages 42 diametrically opposite one another. The fluid passages 42 join the connecting point 24 to the fluid chamber 18 of the hydraulic accumulator, carrying fluid. The valve support 40, along the middle lengthwise axis 44, is provided with a central hole through which the valve shaft 46 of the plate-like valve body 32 extends. As shown in FIG. 1, the free end of the valve shaft 46 is provided with a screw connection 48. Between the lower end of the actual valve plate 50 of the valve body 32 and the top contact surface of the valve support 40, an energy accumulator in the form of a compression spring 52 extends. The energy accumulator 52 tensions the valve body 32, as shown in FIG. 1, into its open position which clears or opens the fluid passage. By the motion of the separating element 12 in the direction of the fluid-side access 20, the valve body 32 travels into its closed position in which the plate edge 30 of the valve body 32 makes sealing contact with the contact bevel 28 of the fluid connecting piece 22.

A fluid-tight safeguard of the interior of the accumulator housing 10 relative to the environment in the area of the connecting piece 22 is achieved by sealing points 54 in a conventional manner which is not described in detail.

The basic structure of a hydraulic accumulator is conventional. The production cost for the connecting piece 22 with an integrated valve support 40 and fixing the valve body 32 on the valve support 40 by a screw connection is considerable. Furthermore, at least the valve plate 50 of the valve body 32 is made as a forged part and also contributes to high production costs. Conversely, with the approach of the present invention shown in FIGS. 2 and 3, a more economical implementation is achieved. The same reference numbers as described above are used for the components to the extent they correspond to one another in terms of their function.

In the present invention, the valve body 32 is an integral, especially a one-piece component, of the valve support 40 which is guided to be able to move lengthwise with its outside periphery 56 along the inside surface of the connecting piece 22. To guide the piston-like valve support 40 along the connecting piece 22, the two components have appropriately made cylindrical guide surfaces which allow uninhibited motion. The structural dimensions for the valve support 40 are such that the height corresponds comparably to its diameter. The dimensions are selected in this way to ensure reliable and straight guidance. In the present invention, four fluid passages 42 (cf. FIG. 2) are provided in the valve support 40 relatively located diametrically to its lengthwise axis 44 and to the lengthwise axis of the valve body 32 and located opposite one another. The fluid passages 42 are bordered to the outside by the outside wall of the valve support 40, with the remaining residual wall thickness, as the figures show, being made small. To the inside, the fluid passages 42 are bordered by the valve shaft 46 which passes in one piece into the other body housing of the valve support 40.

In the present invention, the energy accumulator 52 is a compression spring located underneath the piston-like valve support 40. The compression spring is supported at its one lower end on the connecting piece 22 at its opposing end on the valve support 40. For supporting the compression spring 52 on its lower end, the connecting piece 22 has a contact shoulder 58 which projects to the inside. On its upper end, the compression spring 52 is supported on the annular boundary wall 60 of the valve support 40 so that the four fluid passages 42 are kept free in the direction of the connecting point 24 for the fluid connection (not shown).

Figure 2:
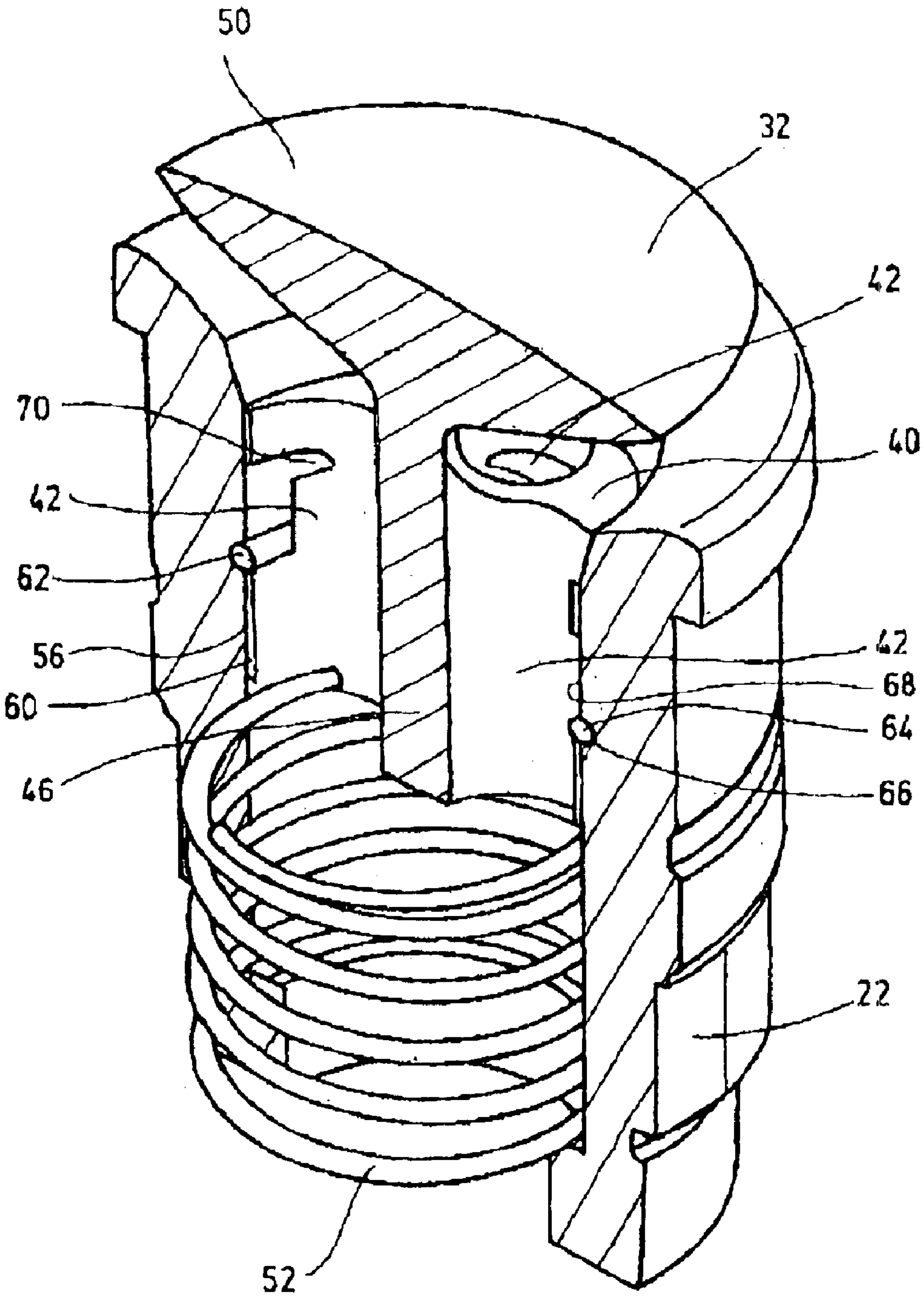
FIG. 2 is a perspective view in section of a valve with a connecting piece, according to one embodiment of the present invention.
Figure 3:
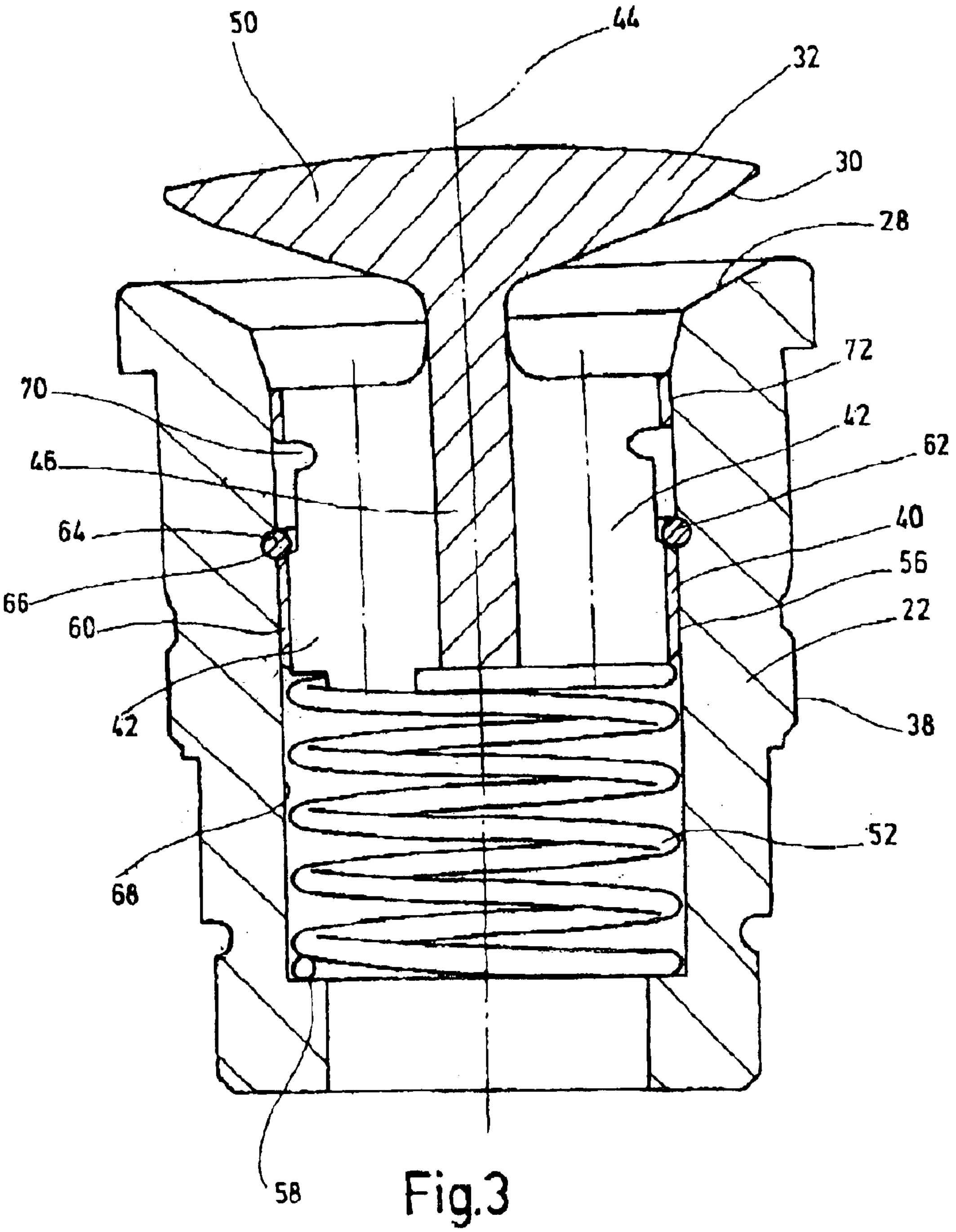
FIG. 3 is a side elevational view in section of the valve shown in FIG. 2.

In the maximum possible open position of the valve body 32 shown in FIGS. 2 and 3, the valve support 40 strikes a stop 62 in the connecting piece 22 so that the path of motion of the valve support 40 is bordered or limited to the top by this stop 62. In the completely closed position (not shown) of the valve body 32, its lower plate edge 30 adjoins or engages the contact bevel 28 of the connecting piece 22. In this closed position, the fluid passage from the fluid chamber 18 in the direction of the connecting point 24 via the fluid passage 42 in the form of longitudinal holes is blocked. The stop 62 is formed by a sealing ring 64 made in the manner of a conventional snap ring. During installation, the annularly elastically flexible safety ring 64 fits into a semicircular recess 66 on the inside periphery or surface 68 of the connecting piece 22.

To produce the connection, the sealing ring 64 is inserted first in of a mounting groove 70 extending annularly and opening on the outside periphery or surface 72 of the valve support 40 and extending into the valve support. After inserting the compression spring 52 into the interior of the connecting piece 22, the valve support 40 with the valve body 32 and the sealing ring 64 can then be pushed into the connecting piece 22 against the action of the compression spring 52 until the mounting groove 70 with the sealing ring 64 therein is at the height of the recess 66 on the inside periphery 68 of the connecting piece 22. Due to its inherent elasticity, the sealing ring 64 then snaps to the outside into the recess 66, and thus, captively forms the stop 62. In the installation position, the valve unit is retained reliably within the connecting piece 22. In the maximum possible open position, the compression spring 52 presses the valve support 40 against the stop 62. In this way, the valve support 40 is held captively in the connecting piece 22. The free path between the stop 62 and the end-side run of the mounting groove 70 is chosen to be larger that the free path of motion of the valve body 32 from the indicated maximum possible open position to its completely closed position. In the closed position, the plate edge 30 of the valve body 32 is in contact with the contact bevel 28 on the top free end of the connecting piece 22. As a result of the inherent elasticity of the sealing ring 64, there is no danger that it could spring back into the mounting groove 70.

The valve support 40 with the valve body 32 and consequently with the valve plate 50 can be obtained as a so-called turned part by machining on conventional automatic lathes. The machining is extremely economical compared to the conventional production by forging. The fluid passages 42 in the valve support 40 are in the form of individual holes made in the valve support 40 on the opposing side of the valve plate 50. The sealing ring 64 can be removed conventionally by access via the fluid passages 42 from the recess 66 on the connecting piece 22 so that the valve unit, as a modular component, can be easily replaced by a new one if repair or the like should be necessary. The present invention can be economically produced and easily installed, thereby reducing the production costs for hydraulic accumulators. The valve system unit at the present invention is not limited to bladder accumulators as hydraulic accumulators. It can also be used, for example, in piston accumulators in which the separating element 12 is made from a separating piston. (not shown).

While one embodiment has been chosen to illustrate the invention, it will be understood by those skilled in the art that various changes and modifications can be made therein without departing from the scope of the invention as defined in the appended claims.

What is claimed is:

1. A hydraulic accumulator, comprising:

an accumulator housing having a gas chamber adjacent a gas access and a fluid chamber adjacent a fluid access, said chambers being located within said housing and separated by a separating element;

a fluid connecting piece of said fluid access;

a valve support located in said connecting piece and having several fluid passages arranged diametrically relative to a longitudinal axis and opposite to one another;

a plate-like valve body integrally connected by a valve shaft to said valve support, said valve body tapering toward said valve shaft on a side thereof facing said valve support, said valve body and said valve support being movable together along said longitudinal axis within said connecting piece between an open position projecting into said fluid chamber and a closed position in which a plate edge of said valve body engages said connecting piece, said valve support being guided for movement by an outside surface thereof engaging an inside surface of said connecting piece, said valve shaft defining inside borders of said fluid passages;

an energy accumulator, located underneath said valve body and between said valve body and said connecting piece, biasing said valve body toward said open position to allow fluid to be conveyed from through said passages and said energy accumulator and allowing said valve body to move to said closed position by said separating element; and a stop in said connecting piece engaged by said valve support in a maximum possible open position of said valve body, said stop being a sealing ring fitted in a recess on said inside surface of said connecting piece.

2. A hydraulic accumulator according to claim 1 wherein said separating element is a bladder.

3. A hydraulic accumulator according to claim 1 wherein said valve support, said value body and said valve shaft are unitarily formed as a single piece.

4. A hydraulic accumulator according to claim 1 wherein said energy accumulator is a compression spring with opposite ends respectively supported on said connecting piece and said valve support.

5. A hydraulic accumulator according to claim 1 wherein a mounting groove with an opening is on said outside surface of said valve support for mounting said sealing ring into said recess; and a distance between said stop and said opening in said maximum possible open position is larger than a distance traveled by said valve body from said maximum possible open position to said closed position.

6. A hydraulic accumulator according to claim 1 wherein said valve body and said valve support is machined as a turned part.

7. A hydraulic accumulator according to claim 6 wherein said fluid passages are individual holes in said valve support.

* * * * *